Jan. 7, 1930.                H. A. KLIEGL ET AL                1,742,600
                                   FLOODLIGHT
                        Filed May 24, 1928        4 Sheets-Sheet 1
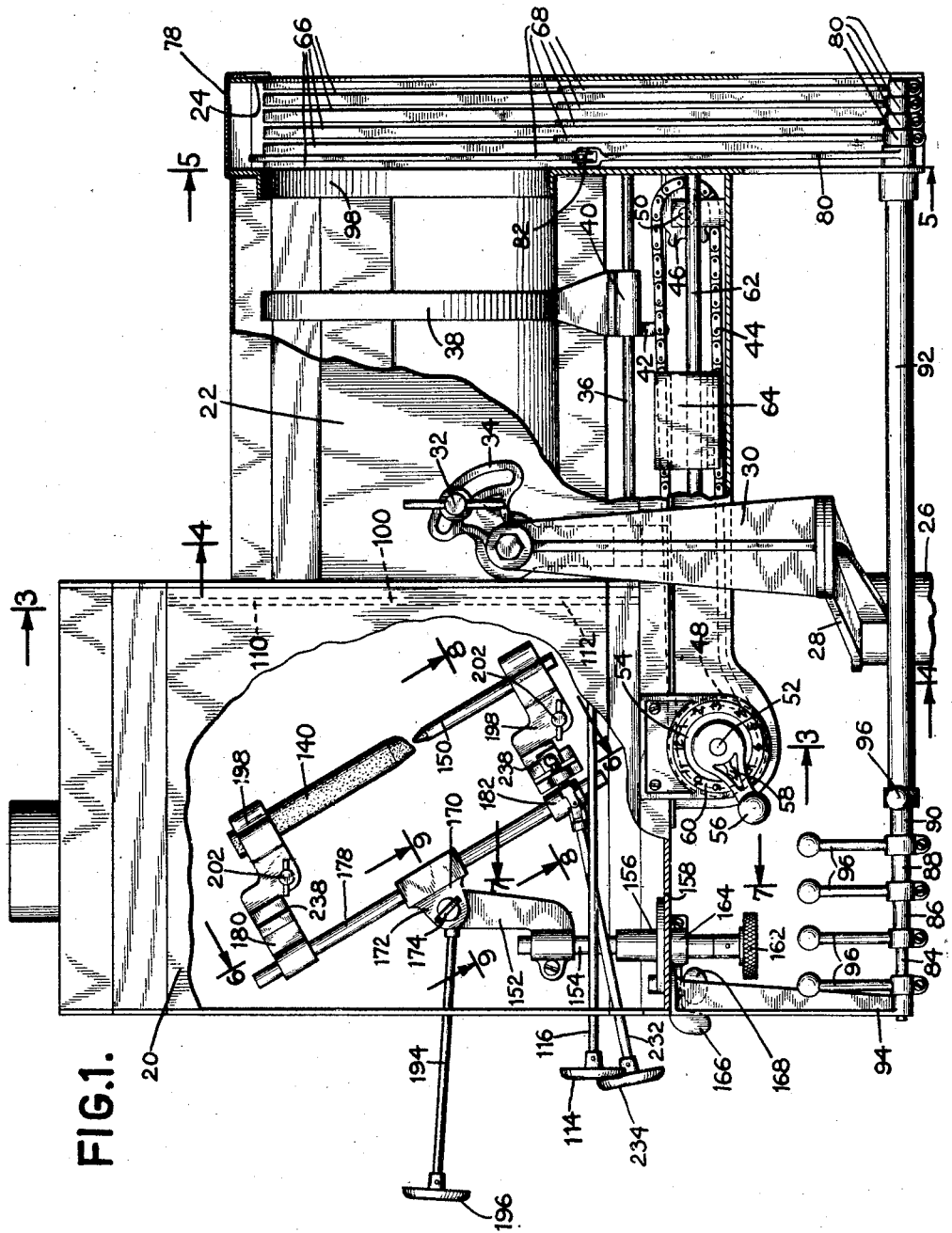
Inventors
H.A. KLIEGL
JOS. KLIEGL
By their Attorneys
Cooper, Kerr & Dunham Jan. 7, 1930.   H. A. KLIEGL ET AL   1,742,600
FLOODLIGHT
Filed May 24, 1928   4 Sheets-Sheet 2
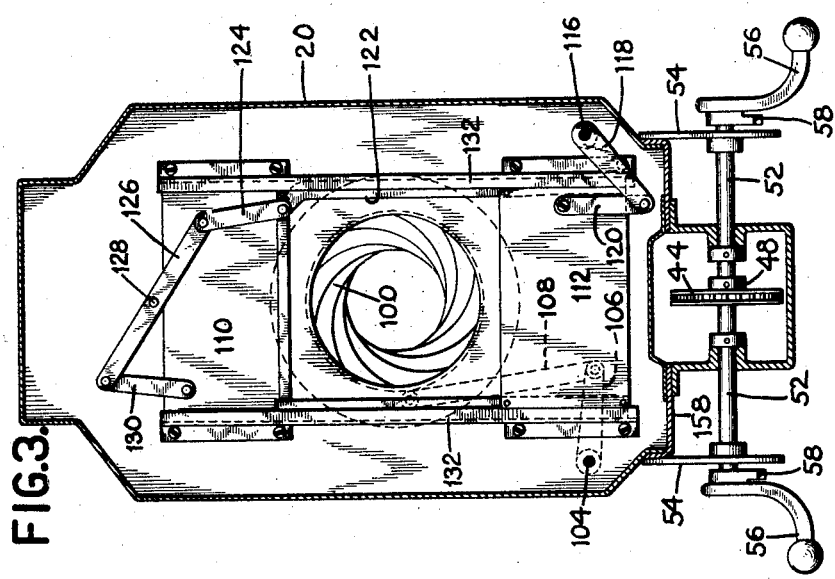
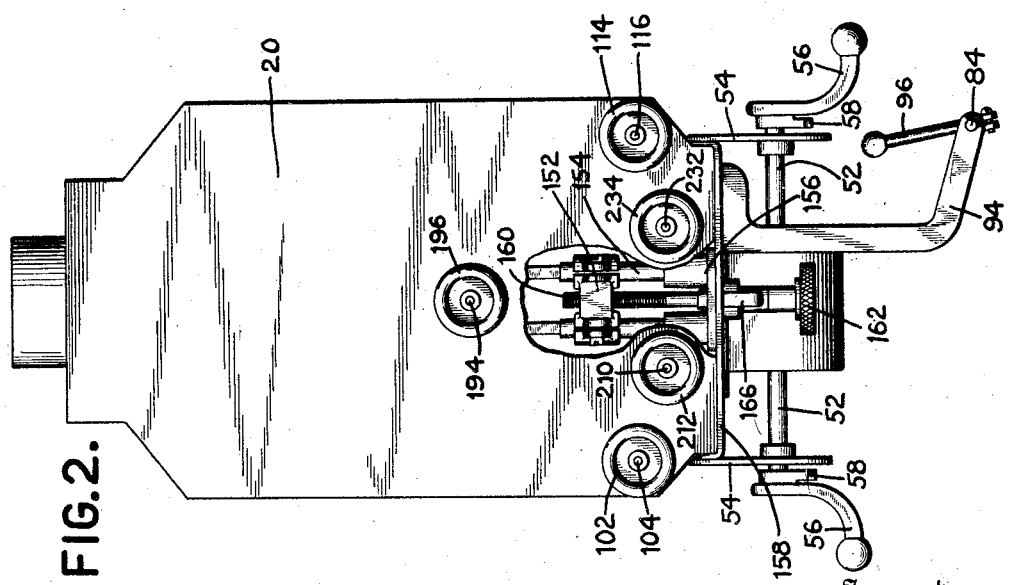
Inventors
H.A.KLIEGL
JOS.KLIEGL
By their Attorneys
Cooper, Kerr & Dunham Jan. 7, 1930.  H. A. KLIEGL ET AL  1,742,600
FLOODLIGHT
Filed May 24, 1928  4 Sheets-Sheet 3
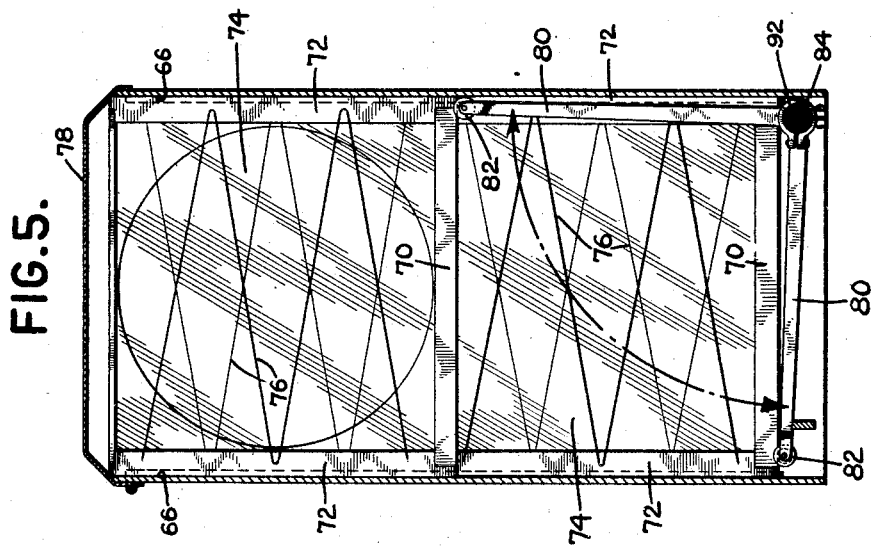
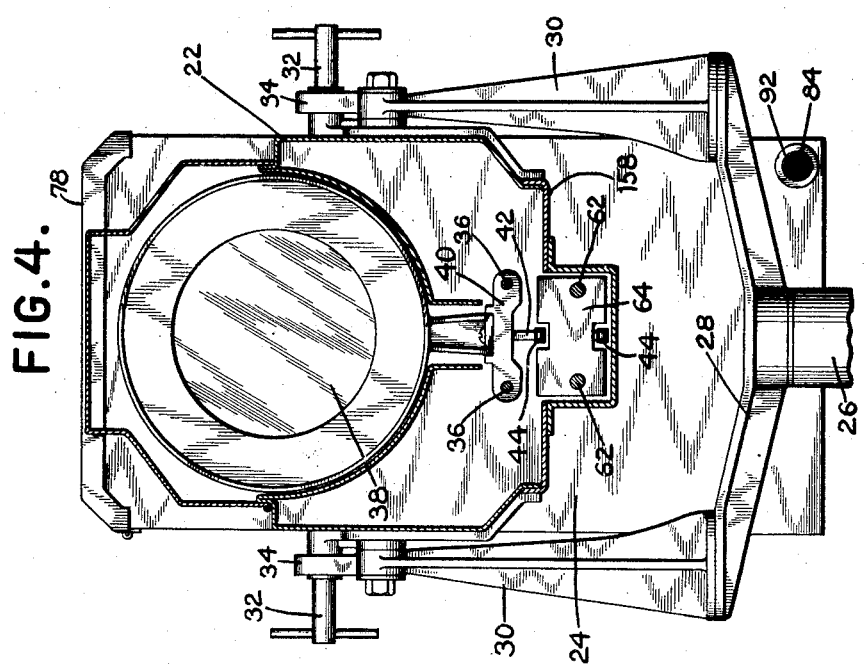
Inventors
H.A. KLIEGL
JOS. KLIEGL
By their Attorneys
Cooper, Kerr & Dunham

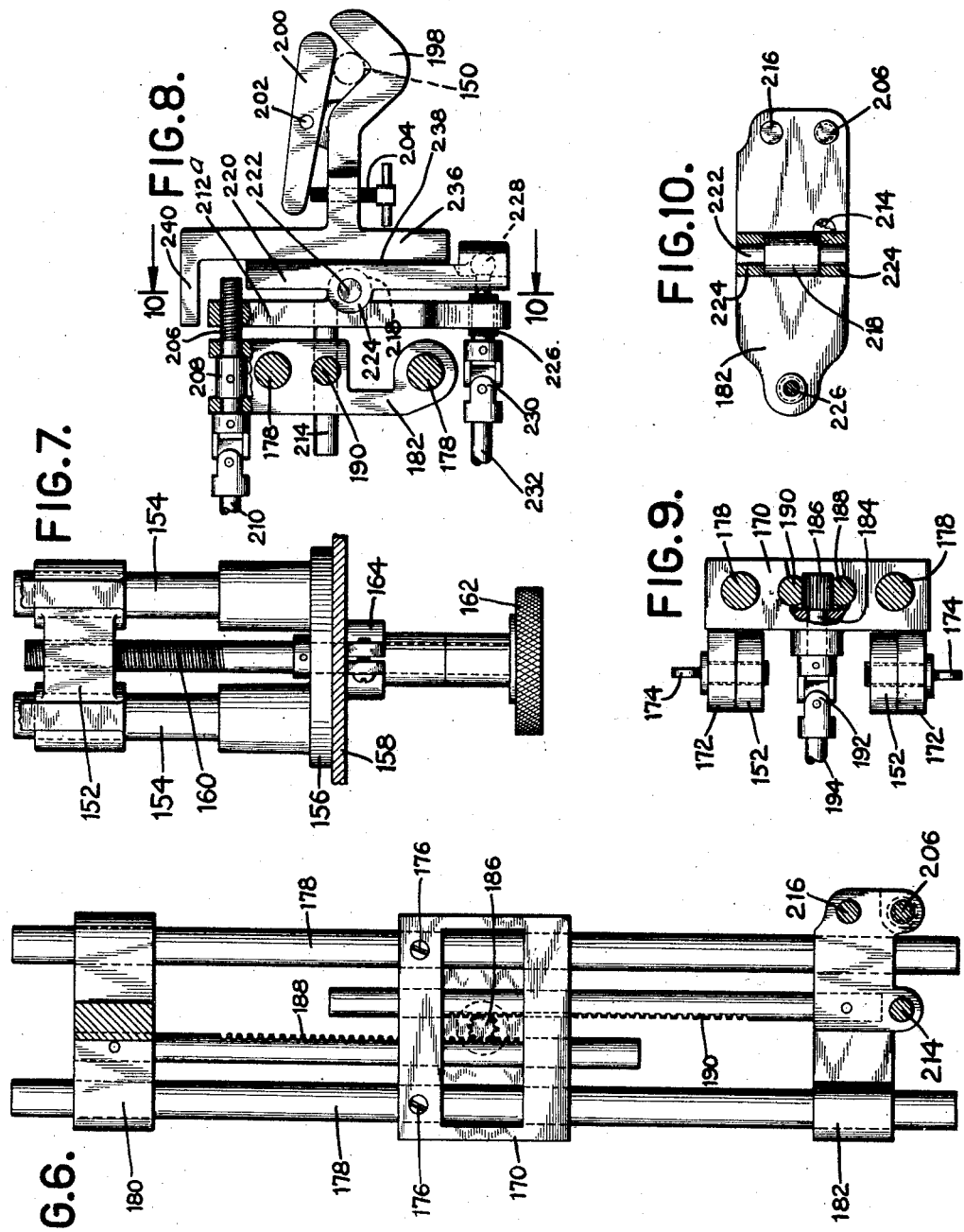

Patented Jan. 7, 1930

1,742,600

UNITED STATES PATENT OFFICE

HERBERT A. KLIEGL AND JOSEPH KLIEGL, OF NEW YORK, N. Y., ASSIGNORS TO KLIEGL BROS. UNIVERSAL ELECTRIC STAGE LIGHTING CO., INC., OF NEW YORK, N. Y., A CORPORATION OF NEW YORK

FLOODLIGHT

Application filed May 24, 1928. Serial No. 280,146.

This invention pertains to flood lights of the type used largely in theatres.

The object of the invention is to so improve the design and arrangement of the apparatus as to greatly enhance the convenience of operation and efficiency thereof.

To these and other ends the invention comprises the novel features and combinations of elements hereinafter described and shown in the drawings, which by way of illustration show what we now consider to be the preferred form of the invention.

In the drawings,

Fig. 1 is a side view of the apparatus, partly broken away to show devices in the interior thereof.

Fig. 2 is a rear view of the apparatus (from the left of Fig. 1).

Fig. 3 is a cross-section on the line 3—3 of Fig. 1.

Fig. 4 is a cross-section on the line 4—4 of Fig. 1.

Fig. 5 is a cross-section on the line 5—5 of Fig. 1.

Fig. 6 is a detail view on the line 6—6 of Fig. 1.

Fig. 7 is a detail view on the line 7—7 of Fig. 1.

Fig. 8 is a detail view on the line 8—8 of Fig. 1.

Fig. 9 is a detail view on the line 9—9 of Fig. 1.

Fig. 10 is a detail view on the line 10—10 of Fig. 8.

The supporting and enclosing structure of the invention comprises, in general, a lamp housing 20, to the front of which is attached the lens housing 22. On the front of the lens housing is mounted the screen housing 24. The whole machine is mounted on a standard 26 (Figs. 1 and 4) having a cross member 28 partially mounted upon the upper end thereof. Pedestals 30 stand on the ends of member 28. Projecting from the sides of casing 22 are trunnions passing through the upper ends of pedestals 30 to provide a pivotal support for the entire structure. Hand screws 32 cooperating with arcuate slotted arms 34 integral with standards 30, serve to hold the structure in any desired tilted or inclined position. The trunnions are located on a horizontal line through the center of gravity of the structure in order that it may be readily movable by the operator and be easily retained in set position by the clamping screws.

In the lower portion of lens housing 22 are two parallel horizontal longitudinal rods 36 upon which lens 38 is slidably mounted for the purpose of focusing and for the additional purpose of bringing the lens to an accessible position at the front of its housing where it may easily be reached through screen housing 24 to replace a broken lens or make other adjustment. The center of the lens travels along the optical axis of the instrument. To support lens 38 on rods 36 a cross-head 40 is provided, upon which the lens structure is mounted. In order to move the lens back and forth on rods 36, we connect cross-head 40 by means of a downwardly projecting lug 42 to the upper strand of a chain 44 which passes over front and rear sprockets 46 and 48 respectively. Sprocket 46 rotates on a short shaft 50 whereas sprocket 48 is fast to a shaft 52 (Figs. 1 and 2) extending from side to side of the machine and supported for rotation in brackets 54. Each end of shaft 52 is provided with a crank handle 56 which has a pointer 58 passing over a numbered dial 60. When handle 56 is turned by the operator the lens is moved along rods 40, its exact position being always known to the operator by means of the pointer and dial.

Attached to the lower strand of chain 44 and slidable on rods 62 is a counterweight 64 which always moves in a direction opposite to that of the lens, thereby preserving the center of gravity of the machine in substantially fixed position regardless of the position of the lever.

Referring now to the screen mechanism at the front end of the machine, it will be noted that the interior of screen housing 24 is provided with guideways 66 to accommodate five color screens 68. The rearmost screen is shown elevated to operative position aligned with lens 38, while the other four screens are shown in normal inoperative position at the bottom of housing 24. Each screen is simply a rectangular metal framework comprising bottom member 70 and side members 72. Across the framework is placed a color medium 74 of gelatin or other material. Wires 76 help to hold the medium flat. To insert the screens in the screen housing, hinged cover 78 is raised and the screens are dropped between guides 72 to their inoperative position at the bottom of housing 24. Extending horizontally under each screen and substantially parallel to frame member 70 thereof, is a crank arm 80 (Fig. 5) having at its free end a grooved roller 82 contacting with member 70 near one end thereof. The other end of each arm 80 is clamped to the front end of one of a set of concentric shafts 84, 86, 88, 90 and 92 (Fig. 1). These shafts extend to the rear of the machine and are there supported by a bracket 94. Each shaft is provided at its rear end with an operating handle 96 by which the shaft may be rotated to move an arm 80 from its normal horizontal position to a vertical position as shown at the right in Fig. 5, and vice versa. When an arm 80 swings from horizontal to vertical it raises its corresponding screen to operative position in front of opening 98 in the rear of housing 24, and when the arm 80 moves back to horizontal the screen follows it by gravity to inoperative position at the bottom of housing 24. There is no operative connection between any screen and its operating arm except roller 82 which travels from end to end of frame member 70. When arm 80 is in its raised position it is slightly past the vertical center line of shafts 84—92, and therefore is automatically held in position by the weight of the screen and also by the weight of the coordinated handle 96 which is then preferably horizontal. It will be understood that the position of any handle 96 will indicate to the operator the position of the screen corresponding to that handle.

Mounted at the front of housing 20, between the lamp and the lens, are two shutters. One is an iris shutter 100 of well known type, operable from the rear of the machine by handle 102 through the instrumentality of shaft 104 (Figs. 2 and 3), crank arm 106, and link 108. The other is a curtain shutter comprising upper and lower curtains 110 and 112. The lower curtain 112 is manually operable from the rear by handle 114 through shaft 116, crank arm 118, and link 120. Shutter 112 has an upwardly extending arm 122, to the upper end of which is attached a link 124, connected at its upper end to one end of a substantially horizontal lever 126 fulcrumed on the machine at 128 and connected at its other end by link 130 to upper shutter 110. Shutters 110 and 112 are guided for vertical motion by guides 132. From the above it will be apparent that when handle 114 is rotated to raise or lower shutter 112, the interconnecting linkage above described will cause upper shutter 110 to move the same distance as the lower shutter but in the opposite direction, thereby providing a shutter having very rapid action.

The arc light used in the present embodiment of the invention comprises an upper carbon 140 and a lower carbon 150 together with suitable devices under control of the operator for adjusting the carbons relatively to each other and for locating them relatively to the optical axis.

The entire light is supported by a bracket 152 (Figs. 1 and 7) the lower end of which is arranged to slide vertically on parallel rods 154 held in a flange 156 fast on base plate 158 of housing 20. A vertical screw 160 passes upwardly through 158 between rods 154 and is threaded into bracket 152. Hand wheel 162 is pinned on the lower end of screw 160, by which the operator may turn the screw and move the entire light structure vertically. Underneath plate 158 is a collar 164 clamped to screw stem 160 to hold flange 156 in close but rotative contact with plate 158. Clamp 164 has a rearwardly extending finger piece 166 by which the operator may slightly rotate screw 160, and therefore flange 156 and bracket 152, about the vertical axis of screw 160. This means that the carbons may be swung sidewise about that same axis. A locking screw 168 passing through a slot in plate 158 and tapped into flange 156 serves to hold the parts in the position to which they are adjusted.

The upper part of bracket 152 is bifurcated as indicated in Fig. 9, and to the arms of the bracket is clamped by screws 174 a member 170, which is formed with two ears 172. This provides means for adjusting and holding member 170 in any desired angular position about the axis of screws 174. Inasmuch as the carbons are supported by member 170, as will appear, they also may be moved bodily about the axis of screws 174 to properly locate the arc relatively to the optical axis.

Held by screws 176 in member 170 parallel to the lamp carbons (Fig. 6) are two guide rods 178. Slidably mounted on rods 178 are the upper and lower carbon holders 180 and 182, respectively. Mounted on shaft 184 for rotatation in member 170 is a pinion 186. Extending downwardly from holder 180 and upwardly from holder 182 are racks 188 and 190 respectively, one rack on each side of pinion 186 so that when the pinion is rotated the racks will move in opposite directions and carbon holders 180 and 182 will be moved toward or away from each other. Shaft 184 is connected by a universal coupling 192 to a shaft 194 on which is pinned a hand wheel 196 by which the operator may rotate pinion 186 and thereby move the carbons axially to thereby adjust the distance between their tips.

Both upper and lower carbon holders are fitted with carbon clamping devices as shown in Fig. 8, comprising a fixed V jaw 198 in which the carbon is clamped by a finger 200 pivoted at 202 on 198 and pressed toward the carbon by thumb screw 204. The lower carbon holder 182 is provided with adjusting devices (Figs. 1, 8 and 10) now to be explained, by which the lower carbon may be adjusted laterally in all directions relatively to the upper carbon.

Passing through one end of holder 182 is a screw 206 provided with a collar 208 set into holder 182 in such manner as to prevent longitudinal movement of shaft 206 while permitting rotation thereof. The rear end of shaft 206 is joined by a universal coupling to a shaft 210 provided with a hand wheel 212 at the rear of the machine. The front end of screw 206 is threaded through the end of a cross bar 212$^a$, from which, near the middle and end thereof, extend guide rods 214 and 216 rearwardly through the lower side and end of holder 182 (Figs. 6 and 8). When screw 206 is turned, bar 212$^a$ will be moved toward or away from holder member 182, thereby moving carbon 150 fore or aft relatively to carbon 140. Extending forwardly from the middle of bar 212$^a$ is a boss 218 upon which is mounted cross member 220 to a rock about a vertical hinge pin 222 which passes downwardly through boss 218 and ears 224 projecting from member 220.

Passing forwardly through the end of bar 212$^a$ opposite screw 206 is a screw 226 threaded in the bar 212$^a$. The forward end of screw 226 is provided with a ball 228 fitted into a socket in the end of member 220 so that when screw 226 is turned member 220 will be rotated about pin 222 with the result that carbon 150, which is rigidly attached to member 220, as will appear, may be swung sidewise relatively to upper carbon 140.

Screw 226 is connected by universal joint 230 to rearwardly extending shaft 323 having a hand wheel 234 for the convenience of the operator.

V clamp member 198 has a cross bar 236 which is rigidly attached to member 220 but insulated therefrom by a layer of insulating material 238. A similar layer of insulation is inserted in upper holder 180. One end of bar 236 is bent at right angles as at 240 to provide a convenient location for attaching wiring terminals.

It is to be understood that the invention is not limited to the construction herein specifically illustrated but can be embodied in other forms without departure from its spirit as defined by the appended claims.

We claim—

1. In apparatus of the class described, in combination, a lens, means for moving said lens along the optical axis to various positions within the apparatus, and devices operable automatically when said lens is moved to prevent movement of the center of gravity of the apparatus.

2. In apparatus of the class described, in combination, a lens, means supporting said lens for fore and aft movement, a counterweight, and means operable automatically when said lens is moved on its supporting means for moving said counterweight in a direction opposite to the movement of the lens, whereby the location of the center of gravity of the apparatus is unmoved.

3. In apparatus of the class described, in combination, a lens, means supporting said lens for fore and aft movement, means under control of the operator for moving said lens on said supporting means, and a device operable automatically to indicate to the operator the location to which said lens has been moved.

4. In apparatus of the class described, in combination, a lens, a guideway supporting said lens for fore and aft movement in the apparatus, means comprising a manually operable chain for moving said lens on said guideway, a counterweight, and means connecting said counterweight to said chain whereby said weight moves in a direction opposite to said lens in order to prevent movement of the center of gravity of the apparatus.

5. The invention set forth in claim 4, in which means is provided to automatically indicate the position of said lens in the apparatus.

6. In apparatus of the class described, in combination, a lamp, a shutter, and a lens in optical alignment with each other, said lens being independently adjustable relatively to said lamp and shutter and interconnected with a shiftable counterweight whereby the center of gravity of the apparatus is unmoved when the lens is adjusted.

7. In apparatus of the class described, in combination, a lamp, a shutter, and a lens in optical alignment with each other, said lens and said lamp being adjustable relatively to said shutter, said lens being independently adjustable relatively to said lamp and shutter and a counterweight shiftable when said lens is adjusted, whereby movement of the lens does not move the center of gravity of the apparatus.

8. In apparatus of the class described, in combination, a lamp, a shutter, and a lens in optical alignment with each other, a casing enclosing said elements, means operable without the casing for adjusting said lens relative to said lamp and shutter, and means interconnected with said adjusting means whereby the position of said lens is automatically indicated at a point without the casing.

9. In apparatus of the class described, in combination, a lamp, a shutter, and a lens in optical alignment with each other, said lens and said lamp being adjustable relatively to said shutter, said lens being independently adjustable relatively to said lamp and shutter, a counterweight shiftable when said lens is adjusted, whereby movement of the lens does not move the center of gravity of the apparatus, a casing enclosing said elements, a graduated dial without said casing, a pointer movable relatively to said dial, and means interconnecting said pointer and said lens adjusting means whereby said pointer indicates on said dial the position of said lens within the casing.

In testimony whereof we hereto affix our signatures.

HERBERT A. KLIEGL.
JOSEPH KLIEGL.